US005674416A

United States Patent [19]

Patrick et al.

[11] Patent Number: 5,674,416

[45] Date of Patent: Oct. 7, 1997

[54] ARC TREATMENT OF METAL SURFACES

[75] Inventors: Edward P. Patrick, Murrysville, Pa.; Philip J. Blakeley, Cambridge, United Kingdom; Regis J. Huth, Jr., Cabot, Pa.; A. Victor Pajerski, New Kensington, Pa.; Christopher M. Seaman, Jeannette, Pa.; Donald J. Spinella, Mt. Pleasant, Pa.; Charles B. Wolf, Irwin, Pa.

[73] Assignee: Aluminum Company of America, Pittsburgh, Pa.

[21] Appl. No.: 520,203

[22] Filed: Aug. 28, 1995

[51] Int. Cl.[6] .................................................. B23K 9/04

[52] U.S. Cl. ........................... 219/123; 148/222; 219/75; 219/137 R

[58] Field of Search ............................... 219/123, 137 R, 219/69.1, 69.11, 75; 148/525, 526, 562, 566, 222; 427/455, 534

[56] References Cited

U.S. PATENT DOCUMENTS

| | | | |
|---|---|---|---|
| 2,472,851 | 6/1949 | Landis et al. | 219/123 |
| 3,471,675 | 10/1969 | Sargent et al. | 219/75 |
| 3,514,567 | 5/1970 | Strang | 219/75 |
| 3,679,418 | 7/1972 | Stroszynski | 219/69.1 |
| 3,924,092 | 12/1975 | Lessmann et al. | 219/123 |
| 5,012,062 | 4/1991 | Banks | 219/69.11 |
| 5,187,046 | 2/1993 | Patrick et al. | 219/123 |
| 5,462,609 | 10/1995 | Patrick et al. | 219/123 |
| 5,481,084 | 1/1996 | Patrick et al. | 219/123 |
| 5,508,492 | 4/1996 | Pajerski et al. | 219/123 |

*Primary Examiner*—Clifford C. Shaw
*Attorney, Agent, or Firm*—Elroy Strickland; Tracey D. Beiriger

[57] ABSTRACT

A method and apparatus for graining a surface having a substantial area traveling at a substantial rate of speed. The method includes directing the surface past an array of electrical arcs traveling about a plurality of loop electrodes arranged to provide overlapping arc loop paths as the surface travels past the array of arc loops. The arc loops are established between the loop electrodes and the traveling surface, and thus contact the surface to grain the same. When each arc is struck between its loop electrodes and traveling surface, it is magnetically impelled about the loop of its electrode by a magnetic field established perpendicular of the direction of arc current flow. An annular sheath of gas is provided on each side of the electrode loop and the arc struck between the electrode loop and the traveling surface.

14 Claims, 4 Drawing Sheets

ARC TREATMENT OF METAL SURFACES

BACKGROUND OF THE INVENTION

Figure 1:
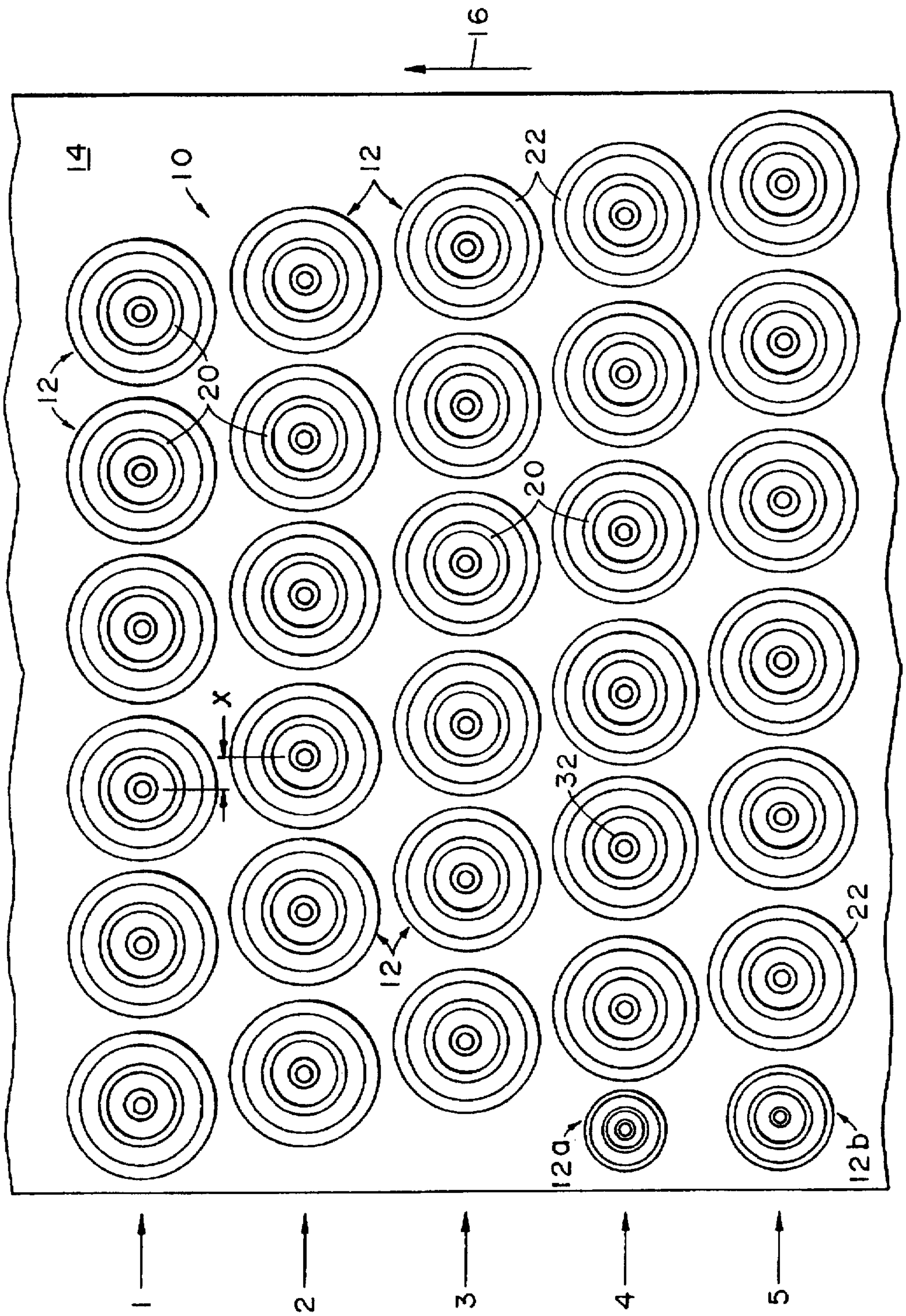

U.S. Pat. No. 5,187,046 to Patrick et al discloses treating the surface of a metal sheet with a magnetically impelled arc. In the preferred embodiment, the arc is propelled along a continuous, elongated electrode loop that extends cross-wise of a traveling sheet of metal by a similarly configured magnetic field producing coil located in close association with the electrode. Such a structure and process is particularly useful in graining aluminum lithographic sheet (lithoplate) though the process can be used for graining and treating the surfaces of other metal products, as disclosed in the patent and application.

Though the elongated loop electrode has been successful in graining lithographic sheet, there is room for improvement as to process speed, uniformity and randomness of texturing, and flexibility. For example, an elongated electrode of fixed length cannot be changed in length to grain sheet material of different widths, that is, for each width, a separate electrode is needed to generally match that of the sheet width.

SUMMARY OF THE INVENTION

The present invention is directed to effective arc treatment of a wide (such as 30 to 70 inches wide or more, for instance about 48 inches wide) metallic strip traveling at a substantial rate, e.g., on the order of hundreds of feet per minute or even 1000 feet per minute, by use of a plurality of small diameter heads and loop electrodes in a compact array spread side-by-side across the width of the strip and along its length. Treating strip at substantial speeds, such as sheet rolling production speeds, requires a high total input of electrical current and, in accordance with the invention, is accomplished with multiple heads and loop electrodes. The use of many, relatively small heads generating circular loop arc paths increases randomization and allows the intensity of the graining process to be controlled for more uniform graining across the width of the sheet, including its edges. When sheet and plate workpieces are reduced in thickness in a rolling mill, the rolls of the mill contacting the surfaces of the workpieces transfer directional grind marks from the rolls to the workpiece surfaces. Such grind marks are formed on the roll surfaces when the rolls are "finished" by roll grinding apparatus. The graining effected by the head array of the present invention removes directional grind marks to provide a sheet of material with a substantially isotropic surface texture in the context of comparison with clearly directional roll grinding patterns.

With each head being capable of delivering sufficient graining current, it can be desirable for the heads to be small, the preferred size of each head depending upon its ability to deliver the necessary are current which, in combination with other small heads, is capable of graining a broad surface area when the surface area is traveling at a substantial rate of speed. The diameter of each head, if it is circular, must be large enough to assemble with a certain ease and not so small as to produce an unstable are operation, as the arc travels repetitively around the circular track of its electrode between the electrode tip and metallic strip. Diameter size of the head comes into play with the use of a circular drum that supports a continuous sheet of material as it travels past each head, i.e., the larger the drum radius, the less arc gap variations are seen for an uncontoured electrode tip. In traveling about the loop of the electrode tip, the arc moves to and from the center of the drum curvature. At the center, the arc is short; at off-center locations, the are becomes extended. Stability of the arc can also be affected by a small electrode radius and the rapid changes in direction caused by a very tight electrode radius.

In regard to the head assembly process, a head with a roughly three-inch diameter electrode, for example, is easier to assemble than a two-inch diameter electrode/head, while a four-inch diameter electrode/head would be more costly and might not provide the concentration of surface treatment afforded by three-inch heads, as the graining paths would be more spaced. There are two reasons for the increase in costs associated with larger heads. First, the larger the diameter of the head, the larger will be the process drum for directing the sheet past the head unless the electrode is curved to fit the curvature of the supporting drum. The drum also serves as an electrical connection back to associated power supplies, and removes heat from the sheet during the arc graining process.

In addition, in treating sheets of different widths, it is easier to provide adjustment of the treated width if small, round heads can be switched in or out, as required. The roughly three-inch head is chosen as a size which best fits the process by providing a manageable number of heads.

Trials indicate that at a given current and travel speed thermal distortion of the strip is dependent upon how efficiently heat can be removed from the strip. Heat is removed from the strip by insuring good physical contact with and conformance to the supporting drum as the strip travels past the graining arcs and in rotating contact with the drum. The roll has a mass that serves to pull heat from the traveling strip and dissipate the heat to the atmosphere and to a coolant circulating in heat removing contact with or within the drum.

In a preferred embodiment of the invention 250 circular heads having circular electrodes of about three-inch diameter are provided and divided into five banks of fifty using five rotatable drums or rolls (one for each bank), as graining is performed on a strip directed over the drums or rolls and past the heads. The drums provide electrical contact with the strip and thereby connect the strip to the return side of the power supply providing arc current. The heads in each bank are aligned in straight rows that are offset with respect to the direction of strip travel so that the arc paths of the heads provide overlapping sweeps of circular travel, as the strip moves past the heads, to grain the strip surface in a substantially uniform manner.

If employed together at one location, too large a number of heads would input a substantial amount of heat into the strip, as it traveled past the heads. With five banks, heat input at each location can perform 20% of the total graining process. Such a rate of heat generation in a litho production line, for example, will not cause buckling of the sheet. Heat buildup in each of the five treatment drums can also be controlled in appropriate ways, and other head array patterns can be employed to achieve selective surface treatment, selected surface texture and thermal input results.

THE DRAWINGS

Figure 2:
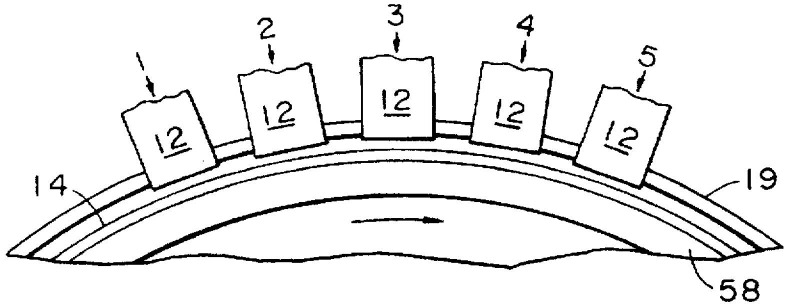
Figure 3:
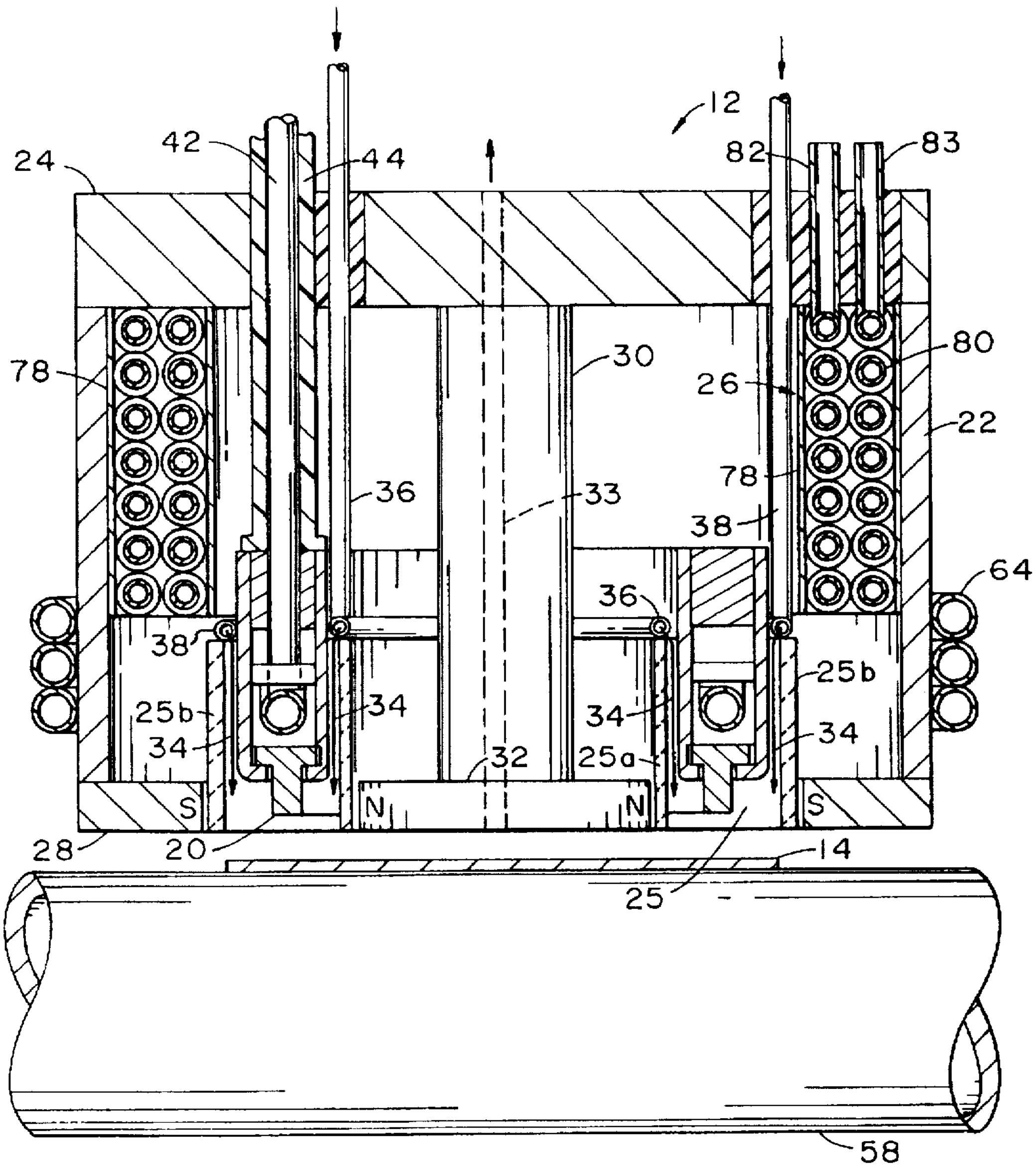
Figure 4:
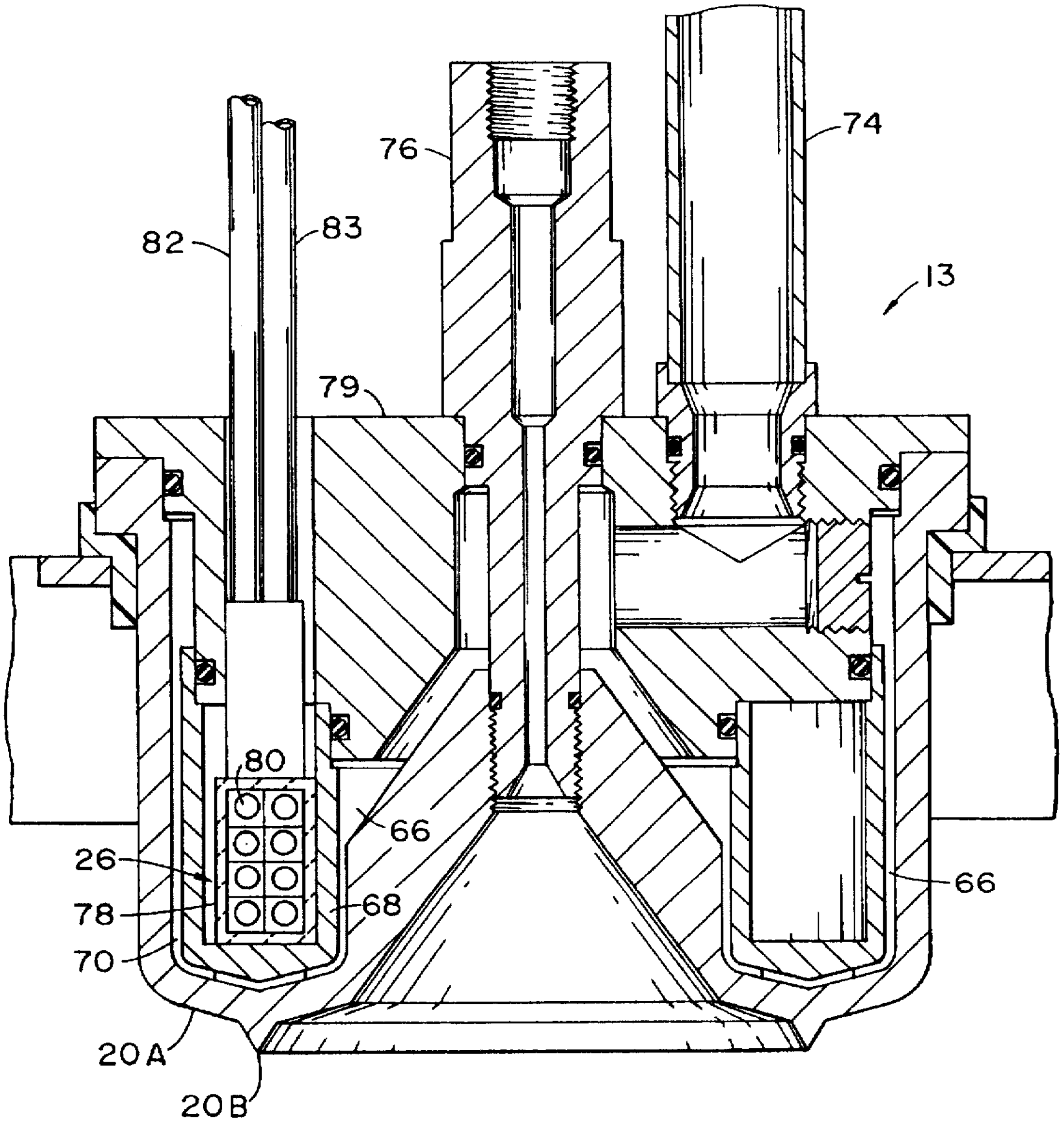
Figure 5:
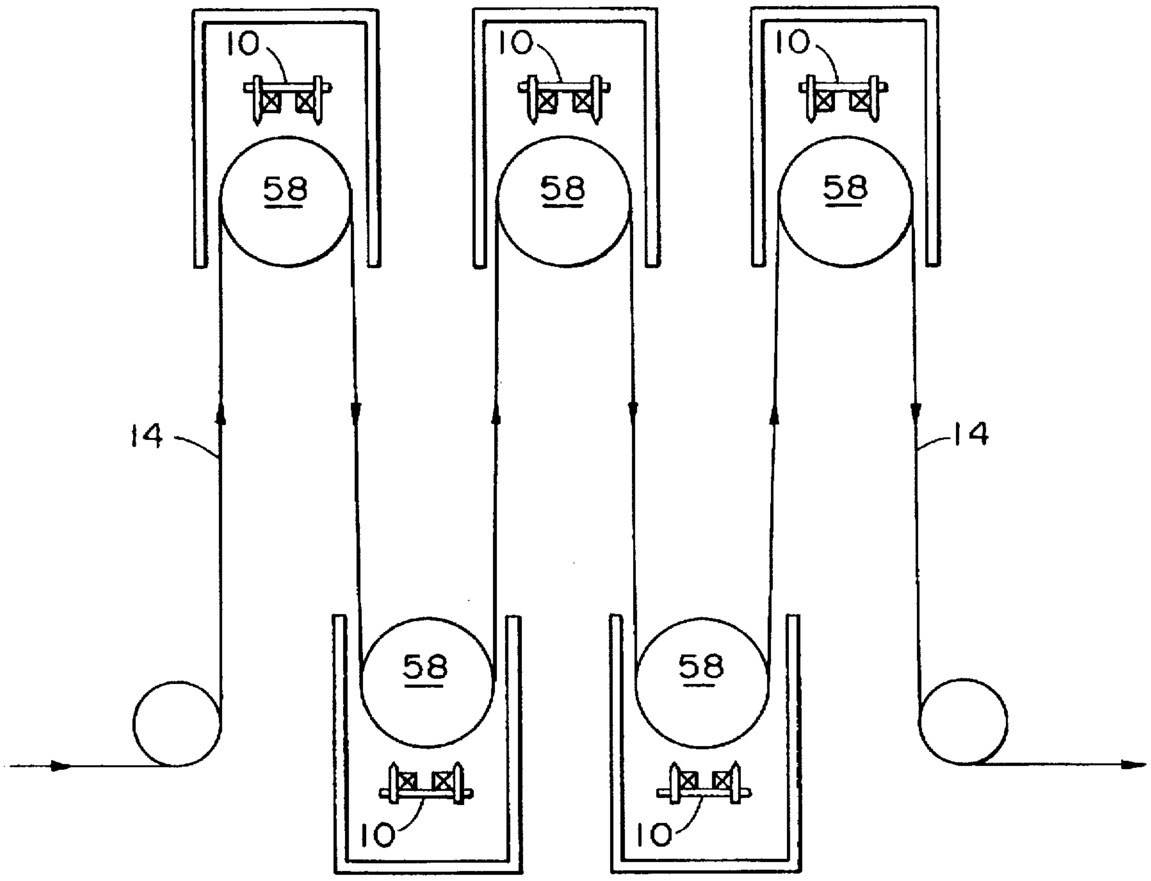

The advantages and objectives of the present invention will be better understood from consideration of the following detailed description and the accompanying drawings in which:

FIG. 1 is a diagrammatic plan view of a multiplicity of circular arc graining heads disposed together for arc graining a sheet of material, FIG. 2 is a diagrammatic and partial end elevation view of five rows of arc graining heads, FIG. 3 is a diagrammatic sectional view of one embodiment of an arc treating head of the invention, FIG. 4 is a diagrammatic sectional view of a second head embodiment of the invention, and FIG. 5 is a diagrammatic view of arc graining both sides of a traveling strip of material at spaced locations along the travel path of the material.

PREFERRED EMBODIMENTS

FIG. 1 of the drawings shows an array 10 of circular arc graining heads 12 disposed in a manner that provides substantially uniform graining of a sheet metal surface 14 directed past arcs (not shown) provided by the heads. As shown, array 10 consists of rows 1 to 5 of heads 12 extending in the direction of sheet travel, see arrows 16 in FIG. 1, with each row containing six heads extending crosswise of the sheet. The array can be extended laterally to treat any width of sheet, and array 10 provides substantially uniform graining crosswise of the sheet width.

In FIG. 1, the rows 1 to 5 of heads 12 are aligned in generally straight rows transverse of the sheet width. Each succeeding row along the longitudinal direction of sheet travel (arrows 16 in FIG. 1 ) is offset slightly from the preceding transverse row. That is, the heads in row 1 are slightly offset from those in rows 2 to 4, and so on.

Each head in FIG. 1 includes a circular loop electrode 20 (depicted in section in FIG. 3), and the arc runs a circular path corresponding to the circular loop of electrode 20. However, since the sheet being treated is moving past the electrode, the arc grain path appears as a spiral path on the moving sheet. The offset in FIG. 1, wherein five rows are shown, the pattern is such that the position of the heads in a sixth row (if there was a sixth row) would align approximately (not be offset from) the heads in the first row (row 1). This slight offsetting from row to row enables thorough and random arc grain texturing at relatively high sheet speed. While the offsetting is gradually progressive in going from row one to row five in FIG. 1, other offset patterns can be used. For instance, row four could follow row one for a sequence such as rows 1, 4, 2, 5, 3. The pattern shown in FIG. 1 is illustrative.

With the slight head offset configuration of the array shown in FIG. 1, the generally central portions of the sheet receive a more uniform and intense graining while the edge regions of the sheet do not receive the same overlap of spiral arc sweeps as the central regions. This can be alleviated somewhat by adding an additional head or two **12*a* and *b* to the array at the edges thereof to more uniformly grain the sheet edges, or the heads located along the sheet edge can extend beyond the edges such that the arc traces contact the surface of a supporting drum 58** (FIG. 3). In this manner, the spiral traces of the arcs near the edges will overlap in the manner of the center traces.

Further, the center of each head 12 in each row 1 to 5 extending across sheet 14 is offset from the head in the next adjacent row by a distance denoted by the term "x" which, for a three-inch diameter electrode, is on the order of one-half (½) inch. Anything greater than three quarters (¾) of an inch excessively spaces the graining paths, whereas a less than one-half inch "x" can provide an excessively non-uniform energy distribution on the grained surface. The number of rows of electrodes lengthwise of the sheet determines the distribution of energy input into the surface being grained, and the amount of offset crosswise of the sheet provides the overlap of arc traces for acceptable uniform graining. In the array arrangement of FIG. 1, any increment of sheet width, for instance an increment of about 0.03 inch wide, is contacted by at least two or three arcs (two or three arc overlaps), preferably at least 4 or 5 arcs, more preferably at least six or seven arcs, the arc contact referred to here being a part of a circular arc contact path. In the array shown in FIG. 1, most increments of sheet width are contacted by the arc of three electrodes although a few may contact only two such arcs. Repeating the array exposure such as is shown in FIG. 5 showing five arrays multiplies this to ten to fifteen arc contacts for each increment of width. If fewer arrays, for instance three arrays, are used, such would multiply the two or three arc contacts to 6 or 9.

Additionally, in FIG. 1, the heads are shown disposed in close proximity to each other in both the transverse and longitudinal directions. However, the structures of heads can be touching in one or both of the above directions depending upon the speed of sheet travel, the amount of arc current and the size (diameter) of electrode 20.

The configuration of head array 10 in FIG. 1 is compact and shows rows of heads progressively offset from each other in the direction of sheet travel. The pattern of the array, however, need not be that of FIG. 1. What is required is that the heads be relatively located to each other to provide overlapping paths of arc loops that generally uniformly grain sheet surface 14, as the sheet travels past the heads. If the spacing between heads is increased, the number of heads and rows required to provide the necessary arc loop overlaps is increased.

Though circular heads 12 will be discussed hereinafter relative to the drawing figures, the configuration of the heads in plan view can be somewhat oval, elliptical or of other shapes that provide a closed loop and a continuous path of travel for the magnetically driven arc. Further, an array of heads can have more than one shape or size. For instance, the first transverse row 1 could use three-inch circular loop electrodes; the second row could use three-inch by four-inch oval electrodes; the third row could use 2 ¾ inch circular loop electrodes, and so on. Even within a row, heads can be different, and heads **12*a* and *b* may be smaller or larger than the other heads 12** in FIG. 1. However, at least from a standpoint of simplification, it can be preferred to use an array of more or less uniform sized heads, such as three-inch circular loop electrodes; the invention is mainly described with this embodiment in mind.

The stability of the rotating arcs can be increased by locating the respective rows 1 to 5 of heads 12 (or 13 in FIG. 4) on a substrate or support structure 19 that is curved to generally fit the curvature of sheet supporting rolls 58 (FIG. 5), one of which is shown partially in FIG. 2 of the drawings. This locates each electrode tip in generally parallel relation to the surface of the sheet supporting drum 58 and the surface of traveling sheet 14.

A cross section of one head embodiment of the invention is shown in FIG. 3 of the drawings and is generally identified by numeral 12. A second head embodiment is shown in FIG. 4 and is designated by numeral 13. Like components of the two embodiments have the same numerical designations.

Head 12 includes an electrode loop 20 shown suitably mounted in a lower portion of a steel shell comprised of a sidewall 22 and an upper wall or plate 24 (in FIG. 3). The electrode loop is located between two circular, concentric, inner and outer sleeves or skirts **25*a* and 25*b* providing an annular area or region 25 about the electrode loop and having lower ends containing and preferably extending below the tip of electrode loop 20 to the site of an arc struck between the electrode tip and a workpiece (14). The skirts are made of an electrical and heat insulating, heat resistant material such as a ceramic material. The skirts thus have annular shapes corresponding to the shape of the electrode loop in plan view (not shown), one 25***b* having a larger diameter than the electrode 20, and one 25*a* having a smaller diameter.

A magnetic coil 26 also preferably having the general shape of electrode loop 20 in plan view is located relatively near but spaced from electrode 20 and within the shell of 22 and 24. A lower, inwardly directed portion 28 of shell 22 extends to a location adjacent outer skirt 25*b* and the tip of electrode 20, while, in the center of the head, is located a steel tube member 30 extending through and supported by plate 24. Member 30 has a lower end portion 32 extending laterally to a location adjacent the inside periphery of inner cup wall 25*a* and the electrode tip, and in the general plane of extension 28. Tube 30 is shown provided with a bore 33 that can be used to remove excess inert shielding or reaction (or process) gas from the vicinity of a rotating arc (not shown) struck between the tip of electrode 20 and the surface of workpiece 14 facing the tip. Gas can be directed downwardly to the arc loop site from locations above and outside and inside of the loop of electrode 20 within the annular skirts straddling electrode 20, as indicated by arrows 34 in FIG. 3, which also designate annular inside and outside spaces between the skirts and the electrode loop. The gas can be supplied to the annular regions 34 between the skirts and electrode by two annular metal tubes 36 and 38 located above the skirts and provided with exit passages or holes (not visible in FIG. 3) facing downwardly in the direction of the electrode. The annular tubes provide ring-shaped conduit manifolds for substantial uniform distribution of the gas about electrode 20 and in each annular region 34 on each side of the electrode. Each tube 36 and 38 thus serves as a means for distribution of the gas in advance of the respective annular regions 34 such that when the gas reaches the vicinity of the electrode, it is in the form of two substantially uniform gas sheaths on each side of the electrode. The insulating skirts confine gas sheaths about the electrode loop and tip and confine the heat of the arc between the skirts. The confinement of the gas and heat provides a more efficient arc plasma and a relatively stable are as it travels in a rapid manner about the loop of the electrode in the arc graining process. The stability of the arc plasma enhances the quality of the arc graining process.

A perforated tube (36 and 38) is one way to provide a generally uniform sheath of gas about electrode 20 and an arc struck between the electrode and a workpiece. A more integral means, however, may be provided in constructing skirts 25*a* and *b*, i.e., an inverted insulating cup, for example, can be fabricated with openings in an upper end wall thereof such that gas directed generally to the upper wall would pass through the openings and into annular spaces 34 about the inner and outer sides of the electrode loop. Or, a wall of porous metal or other material can be provided behind (above) electrode 20 to diffuse gas into the electrode area and arc site.

The components of head 12, as thus far described, are shown in FIG. 3 enclosed in shell 22 and 24 and separated from each other by gas and insulating materials. The steel of the shell and tubular member 30 form a magnetic circuit that provides north and south poles in lower extensions 28 and 32 located in the vicinity of electrode tip 20 when electrical current flowing in coil 26 produces a magnetic field. The magnetic field extends perpendicular to arc current flow which imposes a force on the arc that propels it in a direction that is perpendicular to both arc current flow and the flux of the magnetic field, which is in the direction of the loop of the electrode. The ends of 28 and 32 are spaced sufficiently from the electrode, in comparison to the arc gap between the tip of the electrode and sheet 14, so as not to draw an arc struck between the tip and the sheet to the steel of the poles. Accordingly, the space between poles and electrode is preferably at least twice the electrode to workpiece 14 distance depending on the amount of arc current and the rotational speed of the arc. The steel of the head is insulated from the electrode by insulator 44 in upper wall 24 and rings 25*a* and *b*, but arcs between the steel and electrode are possible.

Electrical leads/conduits 42 (only one of which is visible in FIG. 3), are connected to electrode 20 for conducting electrical current to or from the electrode and a coolant past and in close proximity to the electrode. The lead-conduits extend through plate 24 and are insulated therefrom by suitable insulating bushings 44.

The leads/conduits 42 in each head 12 connect the structure of electrode 20 to the positive polarity output of a power supply (not shown) for purposes of sustaining an arc struck between the tip of electrode 20 and a workpiece 14. Each lead is secured to electrode 20 and can be either a structure distinct from the electrode or can be integrally formed therewith if electrode replacement is not of concern.

Sheet 14 travels in good heat transfer contact with a roll or drum 58, which is one of the five rotatable drums discussed earlier and shown in FIG. 5 at separated, spaced apart locations along the direction of travel of sheet 14. Such separation of the total graining process limits the amount of heat directed into the sheet at any one location by the traveling arcs. The separate drums in FIG. 5 can also be appropriately cooled to pull heat from the sheet and to remove heat from the drums. Cooling the drums helps to prevent the accumulation of heat in the drums.

Cooling of shell 22 and pole pieces 28 and 32 can be accomplished by tubes 64 disposed against the outside or inside surface of the shell. Control of the temperature of the shell maintains a stable magnetic permeability for the shell and thus is helpful in maintaining the stability of the arc as it travels about the loop of electrode 20.

The material of electrode loop 20 is preferably copper, as it is a cost-effective material, having good electrical and heat transfer characteristics, and is a material that is not difficult to make into the loop configuration needed for a magnetically impelled arc. However, tips made of tungsten or carbon also can be useful in graining aluminum alloy sheet.

Preferably, electrodes 20 are replaceable so that electrodes made of a material suitable for the occasion can be used and easily maintained in the production of arc grained sheet. In addition, means (not shown) can be provided to raise and lower lead-conduit 42 to position the electrode relative to the workpiece or sheet being grained.

FIG. 4 of the drawings shows an embodiment 13 of the invention that does not use field shapers (pole pieces) and electrical insulation. Rather, a single piece, monolithic electrode loop structure 20A provides a continuous electrode loop tip 20B and houses a magnetic coil 26 in a deep recess 66 provided in electrode structure 20A. In addition, the electrode provides support and housing for a structure 68 located in recess 66 for housing a magnetic coil 26 in the electrode at a location above tip 20B and about a center hollow portion 72 of the electrode. Coil housing 68 is spaced from the interior surface of electrode 20A to provide a space 70 in recess 66 for conducting a coolant through said space to control the temperature of the electrode during the arc treating processes. The coolant enters and leaves the recess via two conduits 74, respectively, extending into the electrode, only one of which is visible in FIG. 4.

A conduit structure 76 can extend into electrode structure 20A for conducting a gas into the hollow area 72 of the electrode and thus to the area of an arc struck between the tip 20B and a workpiece 14.

Conduits 74 and 76 can be mounted in electrode structure 74 in the manner shown in FIG. 4 where a structure 78 is located in electrode 20A and sealed to the electrode and conduits 74 and 76 by a plurality O-rings.

The structure of the magnetic coils 26 in the embodiments of FIGS. 3 and 4 is preferably comprised of a continuous hollow tube or tubes 80 wound and nested together in an enclosure 78. In FIG. 3, the enclosure is disposed against the inside surfaces of shell members 22 and 24, while in FIG. 4 the tubes are contained in an insulating housing located in support structure 68. The materials of enclosures 78 can be glass reinforced epoxy or other suitable insulating materials. Individual turns of tubes 80 are insulated with similar materials.

Tubes 80 have the general configuration of electrode 20 or 20A in plan view, and are supplied with coolant by a tube 82 A second tube 83 removes the coolant. Tubes 80 can be electrically continuous but may be supplied with a coolant in parallel via multiple respective connecting conduits (not shown) that carry the coolant to and from the hollow tubes. Such tubes, however, can be supplied with power in electrical series to provide the arc impelling magnetic field, i.e., coil 26 can be two or more coils of tubes nested together in housing 78.

In FIG. 4, conduits 82 and 83 also supply and remove coolant from a coiled tube arrangement 80. The total ampere turns (magnetic field) produced by sixteen turns of tubes 80 with a magnet current of 100 amperes is 1600 ampere turns (100×sixteen turns). Such a field can provide a substantial arc velocity.

With separate cooling of the coil tubes 80 and the electrodes (20 or 20A), the amount of current supplied to the electrodes can be that needed to provide effective gaining of a workpiece surface (14) without overheating and damaging the electrodes. Sufficient cooling of the heads permits continuous head operation of array 10 without overheating electrodes 20 and magnetic coils 26.

As discussed above, the totality of the gaining process is preferably divided into a predetermined number or subpluralities of the total number of gaining heads located at spaced apart processing stations along the travel path of sheet 14. This is shown in FIG. 5. In FIG. 5, the total gaining process is divided into five stations or locations that limit the process at any one location to twenty percent of the total process, and thus 20% of the total energy and heat put into the sheet.

In addition, each drum can be cooled, as discussed earlier, and the travel time and distance between each gaining station allows for some cooling of the sheet. Further, in FIG. 5, both sides of the sheet can be grained, as one surface of the sheet is grained at the upper stations in the Figure, and the opposite surface grained at the lower station, i.e., the surface exposed at the upper stations to graining head arrays 10 is not the surface exposed at the lower stations. At the upper stations, the surface being grained by the head arrays 10 faces outwardly toward the head arrays while the inner surface of the sheet travels over and in contact with the upper drums of 58. When the outwardly facing surface of the sheet reaches the lower drums, it is facing inwardly and travels over and against the surfaces of the lower drums while the opposite surface of the sheet is now exposed for graining by the lower head arrays 10.

The head arrays 10 of the invention permit options in producing the magnetic field that drives an arc about the loop of each electrode 20 or 20A. An array of heads, for example, allows the use of one power supply to drive all of the magnetic coils 26 in series, thereby greatly simplifying power supply requirements. In such a case, current requirements for the arcs would be handled by a separate power supply or supplies. If permanent magnets are used, power supplies, of course, are not needed for energizing magnetic coils.

Randomization of the graining process of the invention can be assisted by using different magnetic field strengths and opposed directions of arc travel among heads 12 of array 10 by appropriate connection of the magnetic coils 26 to their power supply or supplies.

What is claimed is:

1. A method of arc graining a surface having a substantial area traveling at a substantial rate of speed, comprising:

directing said surface past a plurality of compact, substantially side-by-side loop electrical arcs arranged to provide overlapping compact arc loop paths spread across the surface as the surface travels past the plurality of compact electrical arcs, establishing said arcs between a plurality of loop electrodes and the traveling surface, and magnetically impelling the plurality of arcs about the loops of their respective electrodes, said magnetically impelled arcs being effective to substantially uniformly grain the surface of the substantial area directed past said arcs.

2. A method of arc graining a traveling surface having a substantial area comprising:

directing said surface past two or more arrays of side-by-side loop electrical arcs established between two or more arrays of loop electrodes and said surface;

each array of electrical arcs having overlapping loop paths as the surface travels past the array of electric arcs;

magnetically impelling said electrical arcs around the loops of their respective electrodes;

distributing gas generally around an annular region corresponding to each electrode loop, and directing the gas as two sheaths, one on each side of each electrode, to each arc.

3. A method of arc graining a traveling surface having a substantial area comprising:

directing said surface past two or more arrays of loop electrodes, each array of electrodes comprising a plurality of rows extending generally transverse to the direction of sheet travel, each row containing a plurality of loop electrodes, with adjacent electrodes being in relative close proximity to each other;

the loop electrodes of one row overlapping those of another row in each such array to provide two or more such overlaps in each said array;

establishing electric arcs at sites located between the arrays of said loop electrodes and said traveling surface, magnetically impelling said arcs around the loops of their respective electrodes;

directing the sheet over a cooled drum on the side of the sheet opposite from said array of loop electrodes;

distributing a gas around an annular region generally corresponding to the configuration of each electrode loop;

directing the gas as a sheath to each side of the arc site; and removing gas from a region inside the loop of the electrode.

4. A method of arc graining a traveling surface having a substantial area comprising:

directing said surface past two or more arrays of loop electrodes, each array of said electrodes comprising a plurality of rows generally transverse to the direction of sheet travel, with each row containing a plurality of side-by-side loop electrodes and respectively cooled magnetic coils each having the general configuration of each of the loop electrodes, and located adjacent said electrodes for generating a magnetic field in respective arc sites located between said electrodes and the traveling surface;

the loop electrodes of one row overlapping those of another row in each such array to provide at least three such overlaps in each said array;

establishing electric arcs at said arc sites and between said loop electrodes and said traveling surface; and using said magnetic coils to magnetically impel said arcs around the loops of their respective electrodes such that a plurality of increments of the traveling surface across its width are contacted by at least three of the electric arcs;

directing the sheet over a cooled drum on the side of the sheet opposite from said array of electrodes;

distributing an inert gas around an annular region generally corresponding to the configuration of each electrode loop;

moving the gas as a sheath to each side of the arc; and removing gas from a region inside the loop of the electrode through a vertical tube located in the general center of the electrode loop and magnetic coil.

5. A compact arc graining head, comprising:

a loop electrode about which an electric arc can be repetitively magnetically impelled after it is struck between a continuous tip of the electrode and an electrically conductive surface, means for supplying a relatively narrow annular sheath of gas on each side of the loop electrode, an annular, heat resistant wall located on each side of the loop electrode, and providing annular, relatively narrow spaces between the respective heat resistant walls and the sides of the electrode in which the narrow sheaths of gas move after entering the annular spaces, means connected to said loop electrode for conducting a coolant to and from the electrode, a compact magnetic coil comprising a plurality of relatively small diameter tubes having the general configuration of said loop electrode in plan view located adjacent the electrode for generating a magnetic field that repetitively impels the arc about the compact loop of the electrode, and for conducting a coolant through the plurality of tubes to cool the magnetic coil, and conduits located to supply and remove the coolant to and from the plurality of tubes.

6. The compact arc graining head of claim 5 in which the means for supplying the sheaths of gas to the loop electrode includes two narrow annular conduits located behind or above the electrode, and having exit passages that direct gas into the annular spaces between the loop electrode and annular walls.

7. A compact arc graining head comprising:

a generally monolithic electrode body providing a continuous compact loop about which an electric arc can be repetitively magnetically impelled after it is struck between a tip of the electrode and a conductive surface, a first recess provided in said body and containing hollow magnetic means for the impelling of said arc about the compact loop of the electrode, conduit means connected to the hollow magnetic means for conducting a coolant to and from the hollow magnetic means, and a second recess provided in the electrode body for conducting a coolant in heat exchange relation with the electrode body.

8. Apparatus for arc graining a traveling metal strip having a substantial surface area using a plurality of compact, side-by-side graining heads spread crosswise and along strip travel and having respective side-by-side annular electrodes that provide a plurality of relatively small continuous loops about which respective arcs struck between the electrodes and the strip are repetitively magnetically impelled, said heads and electrodes being oriented relative to the direction of strip travel to provide overlapping, compact, annular graining paths on the substantial surface area of the traveling strip wherein an increment of traveling sheet width is contacted by the arc of at least three of the annular electrodes.

9. The apparatus of claim 8 in which the plurality of heads includes a plurality of generally transverse rows of the heads, the heads in one of the rows being offset relative to the heads in at least two other of the rows.

10. The apparatus of claim 8 in which each graining head and electrode have a circular configuration in plan view.

11. The apparatus of claim 10 in which the diameter of the electrode is in the range of two and one-half to three and three-quarter inches.

12. The apparatus of claim 8 including an annular wall of insulating heat resistant material located on each side of each annular electrode for confining sheaths of gas directed to and about the electrode, and confining arc heat between the annular walls.

13. Apparatus for arc graining a traveling metal strip having a substantial surface area using a plurality of compact circular heads located in a plurality of rows for extending crosswise of the traveling metal strip and in the direction of strip travel, said heads having respective continuous circular loop electrodes about which respective arcs are repetitively magnetically impelled after being struck between the electrodes and the traveling strip, compact, circular magnetic means for repetitively magnetically impelling said arcs about the circular loops of the respective electrodes, means for directing and confining circular sheaths of gas inside and outside of the loop electrode, and confining arc heat within such means, with the heads in one of the rows being offset relative to the heads in at least two other of the rows in a manner that provides overlapping circular graining paths on the substantial surface area of the traveling strip.

14. Apparatus for arc graining a traveling metal strip having a substantial surface area using a plurality of compact, side-by-side circular heads located in a plurality of rows for extending crosswise of the traveling metal strip, each of said heads having a continuous circular electrode about which an arc is repetitively magnetically impelled after being struck between an integral circular tip of the electrode and the traveling strip, a circular magnetic coil comprised of tubes for conducting a coolant therethrough for repetitively magnetically impelling said arc about the circular electrode tip, circular, inner and outer skirts made of insulating heat resistant material located on each side of the circular electrode for confining sheaths of inert gas inside and outside the circular electrode, and for confining arc heat within a circular area provided by said skins, a passageway located within a circular region defined by the inner skirt and magnetic coil for removing gas from a region inside the circular electrode, with the heads in one of the rows being offset relative to the heads in at least two other rows in a manner that provides overlapping circular side-by-side grain paths on the substantial surface area of the traveling strip.

* * * * *

UNITED STATES PATENT AND TRADEMARK OFFICE

CERTIFICATE OF CORRECTION

PATENT NO. : 5,674,416

DATED : October 7, 1997

INVENTOR(S) : Edward P. Patrick et al.

It is certified that error appears in the above-identified patent and that said Letters Patent is hereby corrected as shown below:

| | |
|---|---|
| Col. 10, line 1 | delete "narrow" before annular |
| Col. 10, line 3 | insert --narrow-- before annular |
| Col. 12, line 3 | after said, delete "skins" and insert --skirts-- |

Signed and Sealed this

Twenty-fourth Day of February, 1998

Attest:

Bruce Lehman

BRUCE LEHMAN

*Attesting Officer* *Commissioner of Patents and Trademarks*